Figure 1:
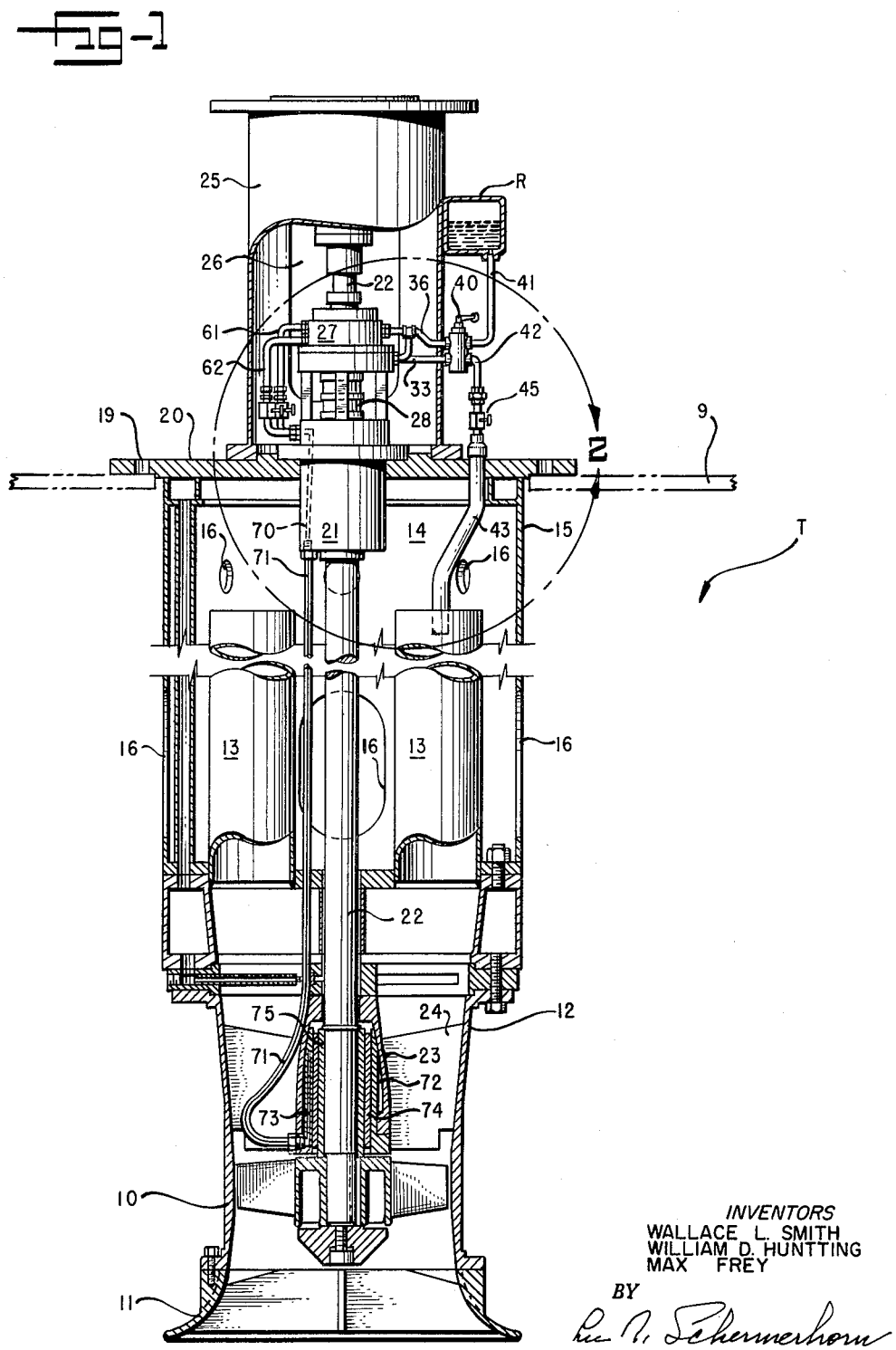

Nov. 30, 1965  W. L. SMITH ET AL  3,220,352
PUMP LUBRICATION SYSTEM
Filed Dec. 3, 1962  2 Sheets-Sheet 1

INVENTORS
WALLACE L. SMITH
WILLIAM D. HUNTTING
MAX FREY
BY
*Lu P. Schermerhorn*
ATTORNEY

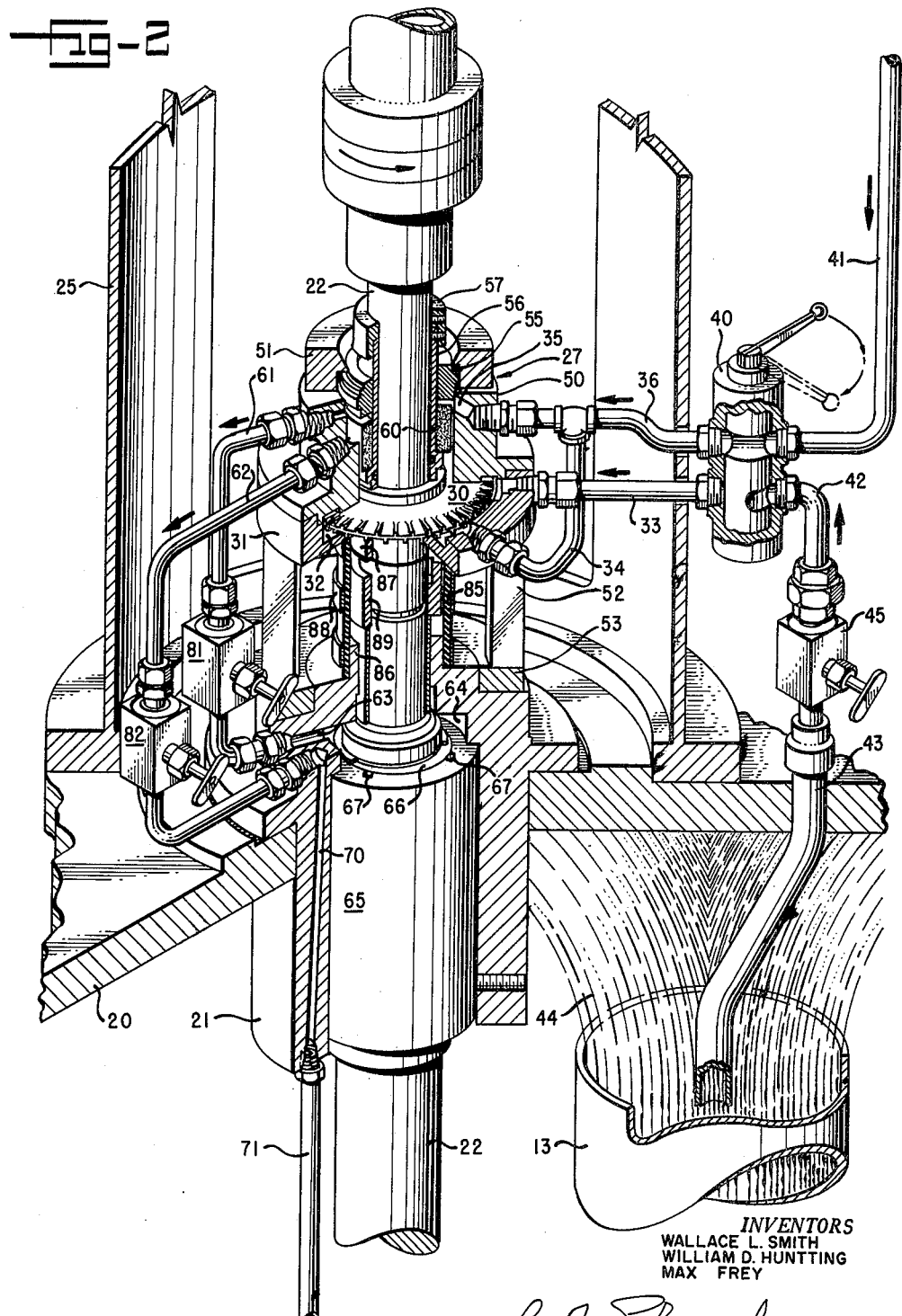

3,220,352
PUMP LUBRICATION SYSTEM
Wallace L. Smith, William D. Huntting, and Max Frey, Portland, Oreg., assignors to Guy F. Atkinson Company, San Francisco, Calif., a corporation of Nevada
Filed Dec. 3, 1962, Ser. No. 241,752
13 Claims. (Cl. 103—111)

This invention relates to a pump lubrication system and has particular reference to a system using the pumpage liquid itself as a lubricant for the shaft seal and bearings of the pump.

For example, in the manufacture of gasoline in refinery operations as, for instance, by the sulfuric acid alkylation process, it has been the practice in the past to introduce outside lubrication in the form of oil to the seal faces and to the bearings of pumps operating in this service. The introduction of this oil, however, even in minute quantities, is detectable in the finished product and affects it deleteriously to some extent.

The general object of the present invention is, therefore, to provide a new and improved form of lubrication system for the seal faces and bearings of such pumps which will not affect the product being pumped. A more particular object is to provide a lubrication system utilizing the pumpage itself as a lubricant for the seal faces and bearings. Another object is to provide a system utilizing the pumpage as a lubricant where the pressure in the system is near the vapor pressure of the pumpage liquid. Still another object is to provide apparatus for the purpose described having relatively simple and inexpensive construction which will operate effectively under the conditions encountered in refinery and other operations with a miimum of service and maintenance.

The present system is not limited to refinery operations in the manufacture of gasoline but is applicable to any liquid pumping system where the conventional use of lubricating oil for the seal faces and bearings would objectionably contaminate the product. In order to avoid vaporization of the pumpage in the lubricating system, the pump shaft is equipped with an impeller forming a lubricant pump having pipe connections arranged to supply an adequate flow of pumpage to the seal faces and bearings under a pressure higher than the pressure of the pumpage from which the lubricating liquid is taken. This avoids evaporation or vaporization problems which would prevent the pumpage from being used directly. The lubricant pump introduces the lubricant into the seal chamber and bearings under pressure sufficient to insure adequate lubrication at all times while the main pump is operating, and additional means are provided for supplying these parts with the pumpage liquid when the main pump is being started. In this way, lubricating oil is kept out of the lubricating system and the product is not contaminated.

The invention will be better understood and the foregoing and additional objects will become apparent from the following description of the preferred embodiment of the invention illustrated in the accompanying drawings. The invention is not to be limited, however, to any particular pumpage liquid as the present installation is illustrated merely by way of example and the invention is of more general application as hereinbefore mentioned. Also, various changes may be made in the construction and arrangement of parts and all such modifications within the scope of the appended claims are included in the invention.

In the drawings:

FIGURE 1 is a vertical sectional view of a gasoline emulsion pump embodying the principles of the invention; and FIGURE 2 is an enlarged fragmentary view of a portion of FIGURE 1, as indicated by the incomplete circle 2, showing the present lubrication system in detail.

FIGURE 1 illustrates an emulsion pump for circulating and mixing volatile liquids in a tank T having a top wall 9. An axial flow impeller 10 draws liquid in through a bellmouth suction inlet 11 and drives it upwardly through a generally cylindrical impeller and diffuser housing 12. The liquid passes upwardly through a plurality of vertical tubes 13 and escapes from the upper ends of these tubes into a chamber 14 defined by a cylindrical outer casing 15. From chamber 14 the liquid flows back into the tank through a plurality of openings 16 in casing 15. Thus, the liquid or mixture of liquids is circulated within the tank. The impeller 10 is submerged and the air and vapor pressure above the liquid surface in the tank is below atmospheric pressure in the illustrated embodiment.

The whole apparatus is supported by a base plate 20 having a marginal portion equipped with bolt holes 19 for attachment to the top wall 9 of the tank. The marginal portion of plate 20 overlies the top wall of the tank about an opening large enough to admit casing 15 and the impeller and diffuser housing 12 with its bellmouth inlet 11. This whole assembly is of sufficient length to place the inlet 11 near the bottom of the tank but spaced a distance thereabove. Plate 20 also supports an upper bearing housing 21 for the pump shaft 22 and the impeller and diffuser housing 12 carries a lower bearing housing 23 supported by radial diffuser vanes 24. The present invention is concerned with the lubrication of the bearings contained within these bearing housings, and a shaft seal presently to be described.

Mounted on the upper side of plate 20 is a cylindrical pedestal 25 to support an electric motor, not shown, for driving the pump shaft 22. Pedestal 25 is provided with openings 26 for access to a seal chamber designated generally at 27 containing a running seal. Below this seal chamber is an auxiliary seal 28 which does not function when the pump is running. The purpose of seal 28 is to provide a temporary seal around the shaft to prevent the escape of liquid or vapors when the running seal is being repaired or replaced. In some installations the liquid in the tank and/or the vapors above this liquid may be under sufficient pressure as to cause it to escape in the absence of such sealing means and such pressure may exist independently of the operation of the emulsion pump. The vapor may be of a corrosive or obnoxious nature and may be explosive or flammable as in the present gasoline process.

FIGURE 2 illustrates the details of the present lubrication system. Mounted on the shaft 22 is a regenerative turbine impeller 30 which rotates in a volute having an annular chamber 32 defined in part by a lower turbine housing 31. Turbine 30 is preferably essentially a flat disc with small vanes or blades struck out from its top and bottom surfaces around its peripheral edge portion so as to rotate any liquid introduced into the volute chamber 32 by means of centrifugal and shear forces on the liquid.

An inlet pipe 33 connects with chamber 32 in a direction radial to the turbine, and an outlet pipe 34 makes similar connection at a point substantially a complete revolution from the inlet connection. Thus, with reference to the indicated direction of rotation of the shaft 22, liquid introduced through pipe 33 is rotated almost a complete revolution in chamber 32 and then discharged through pipe 34 under a pressure considerably higher than its inlet pressure. In order to produce such pressure in the outlet pipe the walls of chamber 32 are contracted into close running clearance with the impeller over the short distance from the outlet connection to the inlet connection. This type of regenerative turbine is well known in the art and does not require more detailed explanation.

Pipe 34 discharges through a passageway 35 in upper turbine housing 50 into the main seal chamber. Pipe 34 is also connected with a pipe 36, and both of pipes 33 and 36 are connected with a manual valve 40. Also connected with the valve 40 are two supply pipes 41 and 42.

The valve handle is shown in solid lines in starting position for connecting supply pipe 41 with the pipe 36 to supply liquid to the lubricating system while the pump is being started. Pipe 41 carries a supply of the liquid from an independent source, such as the small elevated reservoir R in FIGURE 1, under sufficient pressure for lubrication purposes. When valve 40 is in its solid line starting position, connection with the turbine intake pipe 33 is shut off.

When the valve 40 is turned to its broken line operating position, the supply pipe 41 is shut off from pipe 36 and intake pipe 33 is connected with a supply pipe 42. Pipe 42 is supplied by an impact or total pressure tube 43 having a lower open end disposed in the upward flow of liquid 44 from the tube 13, which flow is present when the pump is running. The combined pressure and velocity head of this flow is sufficient to carry the liquid up to inlet pipe 33 which is only a short distance above the impact tube 43. A valve 45 is provided to prevent vapor escape from the tank when repair is required on the shaft seal.

The seal housing designated generally by the numeral 27 comprises the upper portion of upper turbine housing 50 and a seal gland 51 which are bolted rigidly together. The lower end of part 50 is enlarged to form the upper side of the regenerative turbine housing part 31. Thus, the lower side of volute chamber 32 consists of an annular cavity in housing part 31 while the upper side of the volute consists of a similar cavity in housing part 50. Parts 31 and 50 are bolted rigidly together and the whole assemblage comprising parts 31, 50 and 51 is rigidly mounted on a plurality of upstanding posts 52 on a supporting ring 53. Ring 53 is mounted on bearing housing 21.

The shaft seal may be of conventional construction and a preferred embodiment will be described by way of example. Seal gland 51 carries a stationary seat ring 55 of suitable material such as steel. This seat ring is spaced with slight clearance around a sleeve 56 which is fluid-tight on the shaft 22. The upper end of sleeve 56 is secured to the shaft by a drive collar 57. The lower end of the sleeve carries a seal unit 60 which is fluid-tight to the sleeve 56 and spaced with slight clearance within housing part 50. Seal unit 60 is equipped with a spring assembly and washer of suitable material such as carbon which is pressed upward to bear against seat ring 55.

Passageway 35 is directed toward this contact zone and communicating with the annular space between seal unit 60 and the inside wall of housing part 50 which forms the seal chamber. The liquid introduced through passageway 35 thus directly impinges against the seal members and fills the space between turbine impeller 30 and seat ring 55 beneath and around the seal unit 60.

Communicating with this fluid filled seal chamber are two pipes 61 and 62 which have connections tapped through the wall of housing part 50. Pipe 61 supplies liquid for lubrication of the bearing in upper bearing housing 21 and pipe 62 provides liquid for the lubrication of the bearing in lower bearing housing 23. Pipe 61 delivers its liquid through a passageway 63 in the bearing housing 21. This passageway opens into an annular space or chamber 64 which provides a lubricant reservoir at the upper end of the upper bearing.

This upper bearing comprises a bushing 65 secured in bearing housing 21 and a sleeve 66 secured on shaft 22. The sleeve has a smooth cylindrical outer surface while the inner surface of the bushing is provided with a plurality of longitudinal lubricant grooves 67. Liquid from chamber 64 flows downward through these grooves into the emulsion tank whereby the bearing surfaces of the upper bearing are kept lubricated.

The lower bearing is similarly lubricated from pipe 62 through a longitudinal passageway 70 in bearing housing 21 and a pipe 71 which makes connection with the lower end of bearing housing 23 in FIGURE 1. This bearing housing contains an outer bushing 72 having a vertical passageway 73 communicating at its lower end with the pipe 71. The upper end of passageway 73 communicates with openings through the upper end of an inner bushing 74 where the lubricating liquid is distributed to the upper ends of a plurality of internal vertical grooves. These grooves discharge the lubricating liquid at the lower end of this bushing just above the impeller 10. Shaft 22 is equipped with a sleeve 75 which runs in the inner bushing 74.

The passageway 63 is slightly smaller than passageway 70 so as to divide the flow equally between the upper and lower bearings. This compensates for the additional pipe friction which must be overcome by the liquid traveling to the lower bearing. Valves 81 and 82 are provided to prevent the escape of vapors when the seal is being repaired. During operation, the valves 45, 81 and 82 are open.

In starting the pump, valve 40 is turned to its solid line position for supplying lubricating liquid to the seal chamber through pipe 41 from reservoir R. This liquid fills the seal and turbine chambers and then flows out through pipes 61 and 62 to lubricate the upper and lower bearings. As soon as the pump is started, valve 40 is shifted to its broken line position to shut off the pipe 41 and open the connection between pipes 33 and 42. Now, lubricating liquid is supplied to the turbine chamber from impact tube 43 and discharge by the regenerative turbine pump 30 through pipe 34 to fill the seal chamber and supply pipes 61 and 62. The supply through pipe 34 exceeds the capacity of pipes 61 and 62 to remove liquid whereby liquid pressure above the pumpage pressure in tank T exists in the seal chamber. Thus, the lubricating liquid is always under a pressure above the pumpage vapor pressure in all parts of the lubricating system. This prevents evaporation and vaporization problems and assures an adequate supply of liquid lubricant for the seal and bearings at all times and under all conditions of operation even though some of the parts to be lubricated are above the top of the emulsion tank.

Temporary seal 28 is preferably of the type described and illustrated in U.S. Patent No. 3,063,725. It comprises a rubber tube 85 which is sealed at its lower end to a cylindrical flange 86 on the bearing housing 21 and sealed at its upper end to a similar cylindrical flange 87 on the under side of the lower turbine housing 31. A ring clamp 88 is arranged to clamp the mid-portion of this tube tightly against a ring or collar 89 on the shaft. This arrangement effectively seals the shaft between seal housing 27 and bearing housing 21 when the shaft is not rotating. Normally, the clamp 88 is loosened, allowing the shaft ring 89 to rotate with slight clearance within the rubber tube 85.

Having now described our invention and in what manner the same may be used, what we claim as new and desire to protect by Letters Patent is:

1. In a liquid pump having a bearing and a shaft seal, outlet means for the main flow of pumpage from the pump, means to withdraw a small portion of said pumpage from said pump to lubricate said seal and bearing, and means driven by the pump shaft to maintain said withdrawn portion of the pumpage at a pressure above the pressure of said main flow of pumpage.

2. In a liquid pump having a rotary shaft with a bearing and a shaft seal and arranged to discharge a flow of pumpage, an impeller on the pump shaft, means for supplying a small portion of said pumpage from said pump at discharge pressure to said impeller, and means for directing said portion of said pumpage from said impeller to said seal and bearing under higher pressure for lubrication thereof.

3. In a liquid pump having a rotary shaft with a bearing and a shaft seal and arranged to discharge a flow of pumpage, a seal chamber containing said seal, an impeller on said pump shaft, means supplying a small portion of said pumpage from said pump at discharge pressure to said impeller, means conducting said portion of said pumpage from said impeller to said seal chamber under higher pressure, and means conducting said portion of said pumpage from said seal chamber to said bearing.

4. In a liquid pump having a rotary shaft with a seal and a bearing between the pump and said seal, an impeller on said shaft between said bearing and said seal, means for supplying pumpage from said pump to said impeller, a seal chamber containing said seal, a discharge connection from said impeller to said seal chamber, a second means for supply of liquid for said seal chamber, valve means for selecting one or the other of said supply means, and a discharge connection from said seal chamber to said bearing.

5. In a liquid pump having a rotary shaft with a running seal and a bearing between the pump and said seal, an impeller on said shaft between said bearing and said seal, a housing having a chamber for said impeller and a chamber for said seal, a housing enclosing said bearing, a tubular connection between said housings enclosing said shaft, said tubular connection being arranged to form an auxiliary seal on said shaft between said housings, means for supplying a small portion of said pumpage from said pump to said impeller, a discharge connection from said impeller to said seal chamber, and a discharge connection from said seal chamber to said bearing housing, said bearing being arranged to discharge to said pump.

6. In a vertical liquid mixing pump, a vertical shaft having an axial upward flow pump impeller on its lower end, upper and lower bearings supporting said shaft, a regenerative turbine pump on said shaft above said upper bearing, a seal on said shaft above said turbine, a seal chamber containing said seal, an impact tube arranged to receive pumpage from said impeller and supply it to said turbine pump, a discharge connection from said turbine pump to said seal chamber, a reservoir arranged to supply said seal chamber, valve means for selecting one or the other of said sources of supply, a discharge connection from said seal chamber to said upper bearing, and a discharge connection from said seal chamber to said lower bearing.

7. In a liquid pump having a rotary shaft with a bearing and a shaft seal, a seal chamber containing said seal, an impeller on said pump shaft, an impact tube having an open inlet end directed toward a flow of said pumpage from said pump and arranged to supply a portion of said pumpage to said impeller, means conducting said pumpage from said impeller to said seal chamber, and means conducting said pumpage from said seal chamber to said bearing.

8. A liquid pump as defined in claim 7, including means for supplying liquid to said seal chamber from a second source in starting the pump and a valve having one position for connecting said second source with said seal chamber and shutting off said supply to said impeller, said valve having a second position shutting off said supply from said second source and connecting said supply from said impact tube to said impeller.

9. A liquid pump as defined in claim 7, including a second bearing on said shaft and means conducting pumpage from said seal chamber to said second bearing.

10. In a liquid pump having a rotary shaft with a bearing and a shaft seal, a seal chamber containing said seal, a regenerative type turbine impeller on said pump shaft running in a volute chamber, means for supplying pumpage from said pump to said impeller including a radial inlet connection in the periphery of said volute chamber, a radial outlet connection in the periphery of said volute chamber almost a complete revolution away from said inlet in the direction of rotation of the impeller for conducting said pumpage from the impeller to said seal chamber, and means conducting said pumpage from said seal chamber to said bearing.

11. A pump arranged to pump liquid from a liquid supply, said pump having a rotary shaft with a bearing and a shaft seal, an impact tube having an open inlet end directed toward a flow of the pumpage from said pump for withdrawing a small portion of said pumpage, and means conducting said withdrawn portion to said seal and bearing for lubrication thereof.

12. The method of lubricating the seal and bearing of a liquid pump comprising providing a supply of liquid lubricant, conducting liquid from said supply to said seal and bearing while starting the pump, and then after the pump has started shutting off said supply and withdrawing a small portion of the pumpage from the pump and conducting said withdrawn portion to the seal and bearing.

13. The method of claim 12 including the step of increasing the pressure of the withdrawn pumpage before conducting it to the seal and bearing.

References Cited by the Examiner
UNITED STATES PATENTS

| | | | |
|---|---|---|---|
| 1,654,211 | 12/1927 | Hofstede-Crull | 184—6 |
| 2,120,914 | 6/1938 | Vogel | 103—87 |
| 2,556,435 | 6/1951 | Moehrl et al. | 103—87 |

LAURENCE V. EFNER, *Primary Examiner.*

ROBERT M. WALKER, *Examiner.*